United States Patent
Pecina et al.

(10) Patent No.: US 8,203,824 B2
(45) Date of Patent: Jun. 19, 2012

(54) ELECTRICAL MULTILAYER COMPONENT

(75) Inventors: Axel Pecina, St. Martin (AT); Gerald Schlauer, Graz (AT); Gernot Feiel, Lieboch (AT)

(73) Assignee: Epcos AG, Munich (DE)

( * ) Notice: Subject to any disclaimer, the term of this patent is extended or adjusted under 35 U.S.C. 154(b) by 115 days.

(21) Appl. No.: 12/723,831

(22) Filed: Mar. 15, 2010

(65) Prior Publication Data

US 2010/0214720 A1 Aug. 26, 2010

Related U.S. Application Data

(63) Continuation of application No. PCT/EP2008/062394, filed on Sep. 17, 2008.

(30) Foreign Application Priority Data

Sep. 18, 2007 (DE) .......... 10 2007 044 453

(51) Int. Cl.
*H01G 4/06* (2006.01)
*H01G 4/005* (2006.01)

(52) U.S. Cl. ........ 361/311; 361/303

(58) Field of Classification Search .......... 361/303–305, 361/311
See application file for complete search history.

(56) References Cited

U.S. PATENT DOCUMENTS

| | | | |
|---|---|---|---|
| 6,545,857 B2 * | 4/2003 | Kishimoto et al. | 361/321.2 |
| 6,900,978 B2 * | 5/2005 | Shimizu et al. | 361/328 |
| 7,295,420 B2 | 11/2007 | Kojima et al. | |
| 7,336,475 B2 | 2/2008 | Bultitude et al. | |
| 7,394,646 B2 | 7/2008 | Tonogai et al. | |
| 2002/0074154 A1 * | 6/2002 | Kim et al. | 174/137 B |
| 2006/0214263 A1 | 9/2006 | Kojima et al. | |
| 2006/0215350 A1 | 9/2006 | Tonogai et al. | |
| 2007/0195484 A1 | 8/2007 | Bultitude et al. | |
| 2009/0052112 A1 | 2/2009 | Bultitude et al. | |

FOREIGN PATENT DOCUMENTS

| | | |
|---|---|---|
| JP | 02-086109 | 3/1990 |
| JP | 02304910 A * | 12/1990 |
| JP | 07-045473 | 2/1995 |
| JP | 09-148175 | 6/1997 |
| JP | 09-266126 | 10/1997 |
| JP | 2000-133545 | 5/2000 |
| JP | 2000-138129 | 5/2000 |

* cited by examiner

*Primary Examiner* — Eric Thomas
(74) *Attorney, Agent, or Firm* — Slater & Matsil, L.L.P.

(57) ABSTRACT

An electrical multilayer component has a stack of dielectric layers and electrode layers arranged one above another. An electrically insulating stiffening element is arranged at a distance from at least one electrode layer on the same dielectric layer as the electrode layer. The stiffening element preferably has an increased flexural strength with respect to dielectric material surrounding it.

26 Claims, 1 Drawing Sheet

ELECTRICAL MULTILAYER COMPONENT

This application is a continuation of co-pending International Application No. PCT/EP2008/062394, filed Sep. 17, 2008, which designated the United States and was not published in English, and which claims priority to German Application No. 10 2007 044 453.4 filed Sep. 18, 2007, both of which applications are incorporated herein by reference.

TECHNICAL FIELD

The invention is related to electrical components and, in particular embodiments, to an electrical multilayer component having high flexural strength.

BACKGROUND

An electrical multilayer component is known from Japanese patent publication JP 09-266126.

SUMMARY

In one aspect, a multilayer component has increased flexural strength.

In one embodiment, an electrical multilayer component includes a stack of dielectric layers and electrode layers lying one above another is specified, wherein an electrically insulated stiffening element is arranged at a distance from at least one electrode layer on the same dielectric layer as the electrode layer. The stiffening element has a higher flexural strength than the dielectric material surrounding it.

The multilayer component has an increased flexural strength that takes effect particularly in the thickness direction. This means that it is bent to a reduced extent in the case of end-side force actions which may be laterally offset with respect to one another and thereby bring about a shear effect.

The application of one or more electrically non-active reinforcement elements in the plane of an electrode layer in the stack of the multilayer component permits the realization of comparatively low capacitance values whilst avoiding a decrease in the flexural strength of the multilayer component. The construction described affords a multilayer component having a small number of electrode layers and dielectric layers that can be made particularly thin but the multilayer component simultaneously has a high flexural strength. The number of dielectric layers does not have to be increased in order to increase the flexural strength of the multilayer component.

An increased flexural strength of the multilayer component could be advantageous during the transport thereof and/or during the production thereof, where it is exposed in particular to end-side force actions. This could, e.g., take place when the component is gripped for transport and/or for mounting onto a printed circuit board. In this case, the increased flexural strength leads to an increased resistance to damage such as, for example, to the bending away and/or breaking away of dielectric layers and/or electrode layers.

Since the stiffening element can be applied to a dielectric layer of the stack in the same production step as an electrode layer, the number of process steps necessary for producing the multilayer component is furthermore advantageously reduced.

Preferably, the at least one stiffening element or the stiffening structure has a form which runs on a longitudinal side parallel to the electrode layer on the same dielectric. In particular, it can be embodied as a strip. Alongside its electrically insulating properties, the stiffening structure preferably has no contact-connection on all sides or is surrounded by dielectric material.

In accordance with one embodiment, the stiffening structure is embodied as a layer on a dielectric layer. However, it can also be buried in the dielectric layer.

In accordance with one embodiment, the multilayer component has electrical external contacts which are contact-connected to electrode layers, are embodied as a layer and in each case make contact with electrode layers of a common electrical pole. However, it is also possible to provide external contacts in the form of pins or wires.

Electrode layers of opposite electrical poles which are adjacent in the stacking direction, together with a dielectric layer, can form a capacitance. Electrode layers of opposite polarities can be arranged one above another in a comb-like manner relative to one another in the stacking direction and have overlap areas present in orthogonal projection. Each electrode layer is connected at one end to an external contact and spaced apart by the other end from the external contact of opposite polarity.

Alongside each electrode layer, a plurality of stiffening structures can be arranged on the same dielectric layer. For example, a stiffening structure is arranged toward one side surface of the multilayer component and a further stiffening structure is arranged toward the other side surface. A plurality of stiffening structures spaced apart from one another can be arranged toward both side surfaces. In this case, the side surfaces are those at which no external contact is arranged. This avoids the probability of short circuits between the external contact and an electrode layer of opposite polarity.

In accordance with one embodiment of the multilayer component, the stiffening structures contain a same material such as could be contained in an electrode layer. This can be an electrically conductive material, such as metal, for example. In accordance with the amount of electrically conductive material contained in the stiffening structure, the latter is arranged on the dielectric layer at a distance from the electrode layers and from the external contacts or spatially separated therefrom.

If, by contrast, the stiffening structure is highly electrically insulating, the distance with respect to the electrode layers and the external contacts can be minimized. This has the advantage that the stiffening structure could have a larger area and the multilayer component is thereby afforded an even higher flexural strength. At the same time, the electrically insulating property of the stiffening structure reduces the probability of electrical crosstalk between the electrode layers and/or the external contacts.

The stiffening structures have the material property of being particularly heat-resistant. In this case, they preferably withstand temperatures of between 900° C. and 1300° C. In particular, the structure and stiffness of the stiffening structure are intended to be maintained during the production of the multilayer component, for example, during a thermal treatment such as sintering, for example.

In accordance with one embodiment, the stiffening structures contain a preferably electrically insulating ceramic material having a higher flexural strength than the surrounding material of the dielectric layers. Preferably, the sintering shrinkage properties of the stiffening structures are adapted to the carrier material and/or to the dielectric material on which the stiffening structures are arranged and/or embedded.

Alongside pure electrode material such as, for example, silver, silver-palladium, silver-platinum, palladium, platinum, nickel or copper, other materials can be contained in the stiffening structure. For example, a stiffening structure can contain together with the electrode material an additive of the ceramic basic material of the layer stack, that is to say of the ceramic which is used for the ceramic layers of the stack. Thus, the additive can be chosen from at least one of the materials barium titanate, barium neodymium titanate, zinc oxide, cobalt-manganese spinel. Furthermore, non-stoichiometric variants of the ceramic basic material can be used as additive for the stiffening structure, for example in order to modify the sintering shrinkage thereof. Thus, internal stresses can be induced in the ceramic layer stack in a targeted manner. Preferably a tensile stress is induced in this case, that is to say that the stiffening structure or the printed-on ceramic additive thereof has a slightly higher shrinkage than the ceramic basic material of the stack.

One development of the electrical multilayer component provides for a ground electrode to be arranged on a dielectric layer of the stack and to be contact-connected at one end to a ground contact arranged at an outer surface of the stack. In this case, the ground contact could be arranged on the same outer surface of the multilayer component between the external contacts that make contact with the electrode layers. A plurality of ground electrodes could be arranged between dielectric layers and/or electrode layers respectively arranged alongside one another. A ground electrode can advantageously be utilized for imparting a favorable filter behavior to the multilayer component, in which case it can dissipate overvoltages or high-frequency interference associated therewith and thereby protects the multilayer component against overloading. A stiffening structure can be arranged alongside each ground electrode.

Alongside a ground electrode, other circuit elements can also be integrated in the multilayer component, such as, for example, resistance structures or inductances and/or strip lines. A combination of such circuit elements together with the stiffening structures affords the possibility of providing a multilayer component having a multiplicity of filter functions in conjunction with increased flexural strength.

In accordance with one embodiment, the outer surface of the stack is at least partly passivated. The passivation of the stack has the advantage of protecting the materials of the stack, for example, the dielectric layers, electrode layers or the functional layers of the stack, against external chemical or mechanical influences. More constant electrical characteristic values of the multilayer component can be achieved as a result.

In accordance with one embodiment, the passivation of the stack or of the multilayer component is achieved by means of a glass-containing layer applied on at least one outer surface of the stack. However, the passivation could also be achieved by means of a ceramic-containing layer on the outer surface of the stack. The ceramic-containing layer preferably contains one of the following materials: $ZrO_x$, $MgO$, $AlO_x$, where x denotes a number $\geq 1$.

The electrode layers of the electrical multilayer component preferably contain one or an alloy of the following materials: silver, palladium, nickel, copper. The external contacts which are contact-connected to the electrode layers preferably include a material in common with the electrode layers, which promotes the contact-connection of the external contacts and electrode layers to one another.

In accordance with one embodiment of the multilayer component, the dielectric layers contain a capacitor ceramic, for example, from the classes X7R or COG. Dielectric layers which are embodied in this way and arranged alongside one another alternately with electrode layers can form a multilayer capacitor.

In accordance with one embodiment of the multilayer component, the dielectric layers contain a varistor ceramic. A stack of dielectric layers provided in this way, together with electrode layers, forms a multilayer varistor. The varistor ceramic preferably includes zinc oxide (ZnO).

The dielectric layers are preferably embodied in each case with a thickness of less than 1 µm to approximately 30 µm.

In accordance with one embodiment of the electrical multilayer component, a plurality of stacks of electrode layers are arranged alongside one another, wherein the electrode layers of different stacks can be arranged on common dielectric layers. With this construction, the multilayer component has an array of multilayer structures which can all be arranged in the same multilayer component. Since the multilayer component is preferably constructed in monolithic fashion, this means that a plurality of multilayer structures can be contained monolithically as an array in a single stack or basic body. One or a plurality of stiffening structures of the type described can be arranged alongside the electrode layers of each multilayer structure. Particularly in the case of a multilayer component embodied as an array with multilayer structures, where stacks of electrode layers are arranged alongside one another and the area extent of the multilayer component therefore increases, it is particularly advantageous if the multilayer component is afforded an increased flexural strength by means of the stiffening structures.

The stack of electrode layers can be arranged alongside one another both in a longitudinal direction and laterally.

For example, a multilayer varistor and a multilayer capacitor can be integrated as multilayer structures in the same multilayer component.

With integrated resistors and also by means of the electrode layers and dielectric layers containing varistor ceramic in an array design, the multilayer component could be embodied as a Π-filter.

In accordance with one embodiment, the dielectric layers contain a nonlinearly resistive material, for example, an NTC material or a PTC material. If a plurality of such dielectric layers are arranged alongside one another alternately with electrode layers, a multilayer NTC structure or a multilayer PTC structure, respectively, can be provided, wherein the multilayer structures could be integrated with the other multilayer structures already mentioned in the same multilayer component.

The above multilayer structures which are integrated in a common stack of dielectric layers and the dielectric layers of which contain a varistor ceramic, capacitor ceramic or an NTC or PTC material can produce electrical multilayer components having a multiplicity of electrical functions, if appropriate, which in this case nevertheless have a small structural size with high flexural strength.

BRIEF DESCRIPTION OF THE DRAWINGS

Features of embodiments of the invention will be explained in greater detail with reference to the following figures and exemplary embodiments. In this case.

The following list of reference symbols can be used in conjunction with the drawings:

1 Stack of dielectric layers and electrode layers
2 Dielectric layer
3 Electrode layer
4a First external contact 4b Second external contact
F1 First force acting on the end side
F2 Second force acting on the end side

DETAILED DESCRIPTION OF ILLUSTRATIVE EMBODIMENTS

Figure 1:
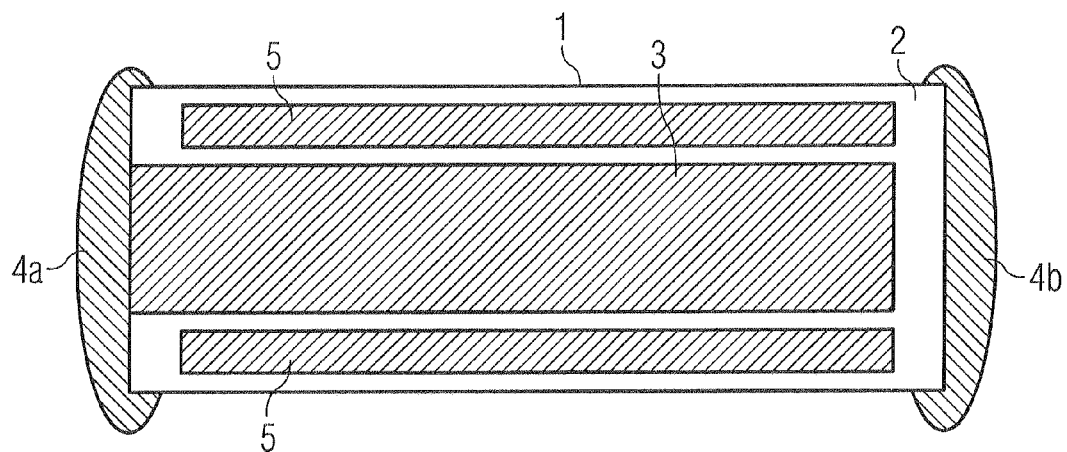
FIG. 1 shows a plan view of a multilayer component with electrically insulating stiffening structures.

FIG. 1 is a sectional view of a plane of a multilayer component embodied as a multilayer capacitor. The multilayer component includes a stack 1 of dielectric layers 2 and electrode layers 3 arranged one above another. The electrode layers 3 are shaped as elongated rectangles and are respectively contact-connected at one end to an external contact 4a or 4b of identical polarity. An elongated stiffening structure 5, containing the same material as the electrode layer, for example, palladium or an alloy thereof with some other electrically conductive material, is arranged alongside each electrode layer 3. It extends approximately from one insulating zone, where electrode layers of opposite polarities do not overlap in orthogonal projection, to the laterally opposite insulating zone of the multilayer component. The stiffening structure 5 is surrounded on all sides by the dielectric material and can therefore be regarded as a "floating" stiffening structure. The arrangement shown in the plan view is repeated at least in part over the height of the stack 1. On the top and/or bottom side, the stack 1 can be provided with further ceramic layers or with a glass-containing layer (not shown) for passivation purposes.

Figure 2:
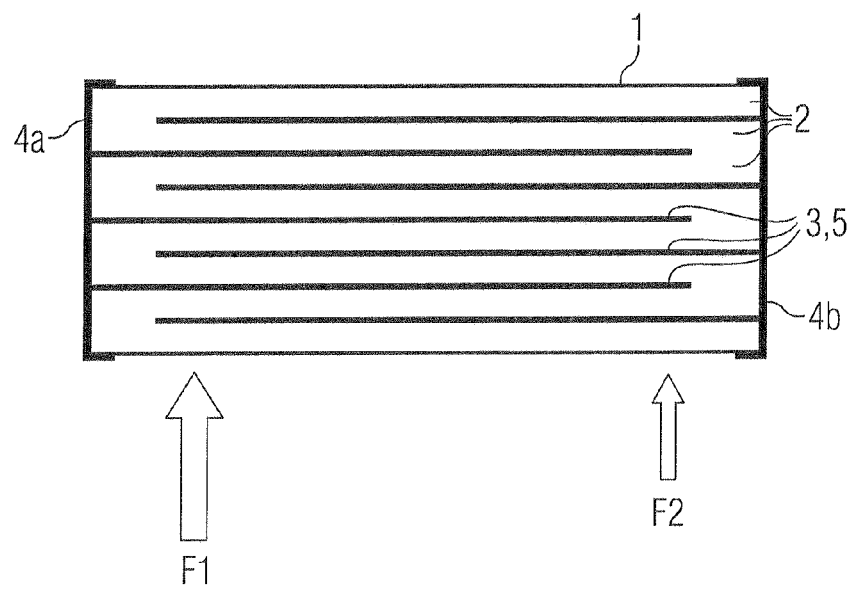
FIG. 2 shows a lateral cross-sectional view of the multilayer component shown in plan view by FIG. 1.

FIG. 2 is a longitudinal section of the multilayer component shown by FIG. 1, wherein the manner of stacking of electrode layers 3 and dielectric layers 2 and also stiffening structures 5 arranged alongside the electrode layers in the same plane is shown. Moreover, external contacts 4a, 4b are shown, which can be fired as strips on side surfaces of the multilayer component. The external contacts can optionally embrace the multilayer component laterally, thereby imparting contact-connection possibilities to the multilayer component on the bottom side.

Arrows F1 and F2 are shown, representing different force actions affecting the multilayer component. If the multilayer component is subjected to a first force action F1, relative to the lateral dimension of the multilayer component, on its first half and to a second force action F2 having lesser or greater intensity on its second half, then mechanical stresses arise in the multilayer component, which mechanical stresses could damage the multilayer component or the constituent parts thereof. The forces could originate in a laterally offset manner from different directions or lead in different directions, such as, for example, a first force acting on the top side and a second force acting on the bottom side of the multilayer component. By means of the stiffening structures, the multilayer component has a sufficiently high flexural strength in order to withstand without damage the mechanical force actions that take place at least during its production and during its transport.

What is claimed is:

1. An electrical multilayer component comprises:
   a stack of dielectric layers and electrode layers arranged one above another; and
   an electrically insulated stiffening element arranged at a distance from an electrode layer and on the same dielectric layer as that electrode layer, wherein the stiffening element has an increased flexural strength with respect to dielectric material surrounding the stiffening element.

2. The multilayer component as claimed in claim 1, wherein the stiffening element has a higher flexural strength than the electrode layer arranged on the same dielectric layer.

3. The multilayer component as claimed in either of claim 1, wherein the stiffening element comprises electrically insulating material.

4. The multilayer component as claimed in claim 3, wherein the stiffening element comprises ceramic material.

5. The multilayer component as claimed in claim 1, wherein the stiffening element comprises an electrically conductive material and is electrically insulated from the electrode layer on the same dielectric layer.

6. The multilayer component as claimed in claim 5, wherein the stiffening element comprises the same material as the electrode layers.

7. The multilayer component as claimed in claim 1, wherein the stiffening element extends in the longitudinal direction alongside a longitudinal side of the electrode layer on the same dielectric layer.

8. The multilayer component as claimed in claim 1, wherein the stiffening element comprises one of a plurality of stiffening elements arranged along a longitudinal side of the electrode layer.

9. The multilayer component as claimed in claim 1, wherein the stiffening element is applied as a layer to a dielectric layer.

10. The multilayer component as claimed in claim 1, wherein the stiffening element is buried in a dielectric layer.

11. The multilayer component as claimed in claim 1, wherein the stiffening element comprises a strip.

12. The multilayer component as claimed in claim 1, further comprising a first external contact disposed on a first side surface of the stack and a second external contact disposed on a second side of the stack, each external contact making contact with respective ones of the electrode layers.

13. The multilayer component as claimed in claim 1, wherein the dielectric layers contain a capacitor ceramic.

14. The multilayer component as claimed in claim 13, wherein the multilayer component comprises a multilayer capacitor.

15. The multilayer component as claimed in claim 1, wherein the dielectric layers contain a varistor ceramic.

16. The multilayer component as claimed in claim 15, wherein the multilayer component comprises a multilayer varistor.

17. The multilayer component as claimed in claim 1, further comprising a second stack of electrode layers and dielectric layers arranged one above another, wherein the dielectric layers of the stack contains a different functional ceramic as the dielectric layers of the second stack.

18. The multilayer component as claimed in claim 17, wherein the stack comprises a multilayer capacitor.

19. The multilayer component as claimed in claim 18, wherein the second stack comprises a multilayer varistor.

20. The multilayer component as claimed in claim 17, wherein the stack and the second stack are arranged laterally alongside one another.

21. The multilayer component as claimed in claim 17, wherein the stack and the second stack are arranged one above another.

22. The multilayer component as claimed in claim 1, wherein the dielectric layers, electrode layers and the stiffening element are combined to form a monolithic body.

23. The multilayer component as claimed in claim 1, further comprising a ground electrode disposed on at least one dielectric layer, the ground electrode being contact-connected to a ground contact arranged at a side surface of the multilayer component.

24. The multilayer component as claimed in claim 1, wherein the electrode layers comprise at least one material selected from the group consisting of silver, palladium, nickel, and copper.

25. The multilayer component as claimed in claim 1, wherein an outer surface of the stack is at least partly passivated.

26. The multilayer component as claimed in claim 25, further comprising a glass-containing layer, wherein the outer surface of the stack is coated with the glass-containing layer.

* * * * *